Patented Apr. 29, 1924.

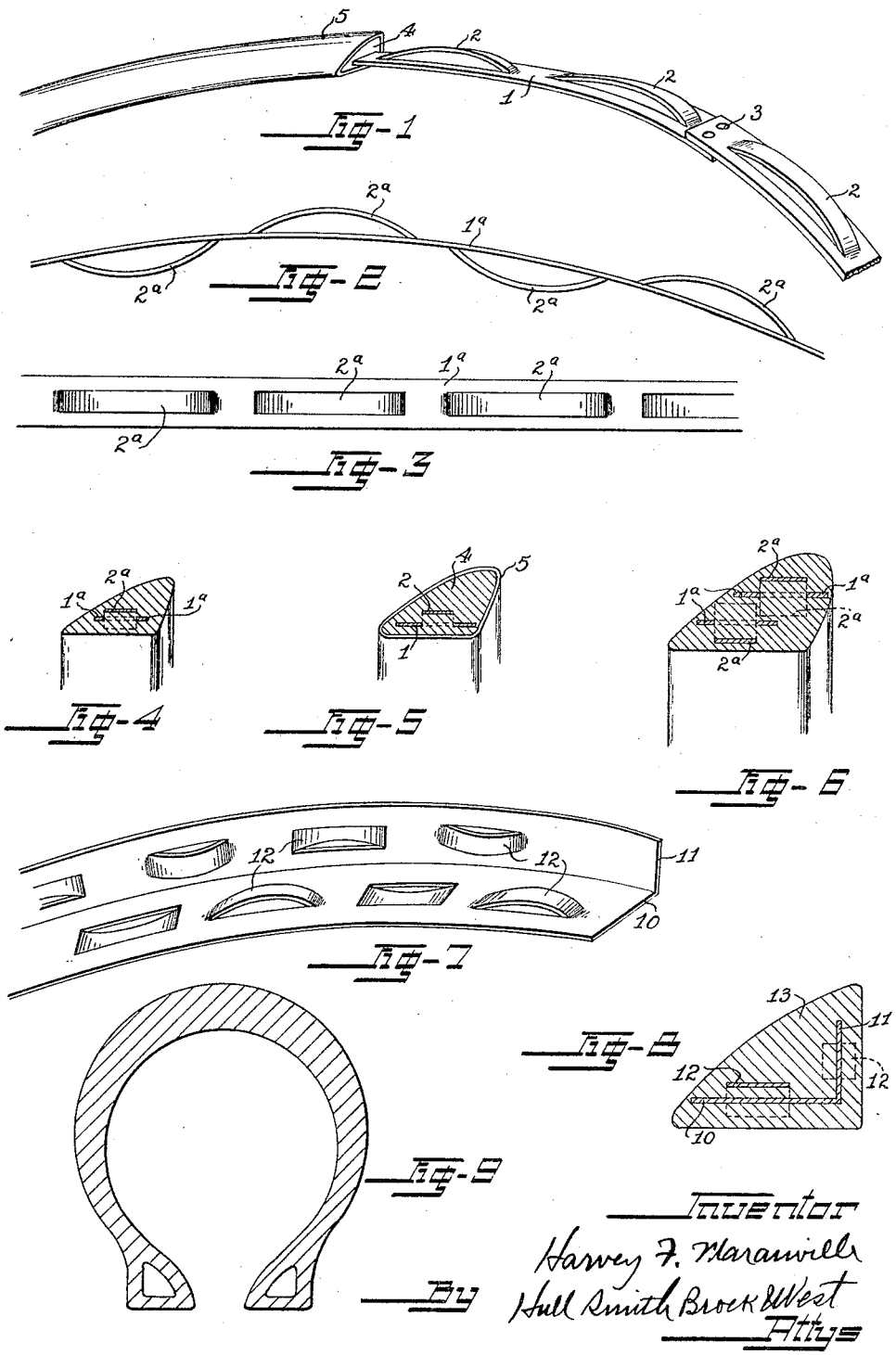

1,492,256

UNITED STATES PATENT OFFICE.

HARVEY F. MARANVILLE, OF AKRON, OHIO, ASSIGNOR, BY MESNE ASSIGNMENTS, TO THE FIRESTONE TIRE AND RUBBER COMPANY, OF AKRON, OHIO, A CORPORATION OF OHIO.

RESILIENT TIRE.

Application filed December 11, 1919. Serial No. 344,133.

*To all whom it may concern:*

Be it known that I, HARVEY F. MARANVILLE, a citizen of the United States, residing at Akron, in the county of Summit and State of Ohio, have invented a certain new and useful Improvement in Resilient Tires, of which the following is a full, clear, and exact description, reference being had to the accompanying drawings.

This invention relates to pneumatic tires and especially to the construction of the beads thereof. In order to secure a tire in place upon its rim it is necessary to provide a bead of great longitudinal strength in order to prevent its being stretched over the edge of the rim by the pressure of the air or the shocks and mishaps of use. At the same time the bead must have a considerable degree of flexibility in order to enable its attachment and removal, yet without any material yielding in transverse shape which would deform the lip of the tire and prevent it from retaining its hold upon the rim. In order to serve these conflicting requirements, numerous constructions have been suggested largely characterized by the employment of wire reenforcements surrounded by rubber compositions of greater or smaller flexibility, a plurality of wires being braided, twisted, corrugated, or webbed together in an attempt to obtain tensile strength without too much rigidity, the whole generally submerged in and embraced by some kind of rubber composition. Those structures possess the disadvantages that the wires become straightened and hence elongated, permitting the bead to slip over the rim; or that some of the wires work sideways through the bead under repeated flexure of the tire, severing the bead from the body of the casing; or that some of the individual wires become broken and pierce the casing walls; or the different components of the bead become displaced relatively to each other so as to change its shape and hence deform the tire bead so that it loses its hold on the rim.

The objects of my invention are the provision of a new bead construction which shall fulfill the requirements above mentioned without exhibiting any of the disadvantages above enumerated; the provision of a cheap, flexible, and inextensible bead which shall not be subject to deformation in use and which shall be much cheaper to make than previous constructions; and further objects and advantages of the invention will become apparent as the description proceeds.

In the drawings accompanying and forming a part of this application, I have shown certain illustrative embodiments of my said invention, although without intent to limit myself to the identical physical structures therein set forth since my invention can be utilized in a great many forms and I do not restrict myself except as recited in the claims hereto annexed. In these drawings, Fig. 1 is a perspective view of a part of a tire bead embodying my improvements, a portion of the reenforcement projecting therefrom; Fig. 2 is an edge view and Fig. 3 a plan view of a slightly modified type of reenforcing strip; Figs. 4, 5 and 6 are cross sectional views of different bead constructions embodying such strips; Fig. 7 is a perspective view of a modified form of strip; Fig. 8 a sectional view of a bead employing such modification; and Fig. 9 is a sectional view of a tire casing in which my improved bead is employed.

The essence of my invention consists of the employment of a reenforcement of sheet metal instead of the wires or straps heretofore employed, and in displacing portions of such reenforcement relatively to other portions in such wise as to cause the bead material and the reenforcing strip to become permanently interlocked; it is a second feature of my invention that the reenforcing material should not be shortened nor all of its portions deflected out of line by the displacement of its securing portions, but that only certain portions are deflected for the purpose of interlocking with the bead material, other portions being left undeflected in order to carry the tensile strain.

In the beads shown in Figs. 1 and 4, the reenforcement consists of a single strip of sheet metal 1 having spaced portions 2—2 defined between parallel longitudinal slits displaced from the plane of the strip while remaining integrally attached thereto at their ends. The reenforcement is circled into the form of a hoop and its ends over-lapped and permanently secured together as by rivets 3—3 or by welding, after which the entire reenforcement is surrounded by a suitable rubber composition 4 which is compressed into close engagement therewith so as to cause such composition to flow around and between all of its parts as shown in Fig. 5, after which it is cured by heat in the usual manner. An outside layer 5 of cloth or fabric may or may not be used as desired.

In Figs. 2, 3 and 4 I have shown a modified type of reenforcing material in which the same body 1 is employed but the portions 2ª—2ª, instead of being punched all in the same direction, are displaced alternately to one side and the other side of the strip 1ª. In both these cases, it will be noted that the body of the strip has not been deflected by the operation, and hence its length has not been changed, wherefore the undeflected body of the strip is available to sustain the entire tensile strength required of the bead.

In Fig. 6 I have shown a bead as formed by winding together two strips such as shown in Figs. 2 and 3, their projecting portions interlocking in such wise as to conform approximately to the external shape of the bead.

In Figs. 7 and 8 the reenforcement is shown as having a main body portion 10 and an upturned flange 11, both portions having spaced regions displaced therefrom as shown at 12—12 so as to permit the bead material 13 to interlock therewith, but without any change of the length of the reenforcement. This reenforcement is circled into the hoop form with the flange 11 projecting outwardly after which the bead material is molded about the same as before. After these beads have been cured and finished in the usual way they are incorporated in the casing of a tire as shown in Fig. 9, the fabric or cord reenforcements being wrapped around or secured to the same in any suitable or desired manner.

Having thus described my invention, what I claim is:

1. A pneumatic tire having a pair of laterally flexible non-extensible beads around its interior each of said beads having a reinforcement therein consisting of a flexible metal strip having certain portions displaced alternately upon opposite sides of the strip to interlock with the material of the bead.

2. As an article of manufacture, a bead for pneumatic tires comprising a circular strip of sheet metal having pairs of longitudinal slits formed at intervals therein, the portions defined by said slits being displaced from the body of said strip alternately on opposite sides to form loops and resulting to form apertures, and a mass of plastic composition surrounding said strips and penetrating said apertures, such mass being approximately triangular in cross section a flange extending from one edge of said strip and also having apertures the displaced metal loops being imbedded in the plastic composition.

3. As an article of manufacture, a bead for pneumatic tires comprising a circular strip of sheet metal having pairs of longitudinal slits formed at intervals therein, the portions defined by said slits being displaced alternately on opposite sides from the body of said strip to form apertures, and a mass of plastic composition surrounding said strips and penetrating said apertures, a portion of said strip being everywhere undeflected to carry the tensile strain imposed on said bead.

4. As an article of manufacture, a bead for vehicle tires comprising a ring-shaped mass of semi-rigid composition which is substantially triangular in cross-section and a reinforcement in said bead comprising a sheet metal strip encased in said composition having an upturned flange on one edge and having spaced apertures through which said composition extends, said apertures being formed by cutting a plurality of parallel slots in the strip and striking up the metal therebetween alternately on opposite sides of the strip.

5. A bead reinforcement for vehicle tires consisting of a flexible sheet metal strip having spaced elongated apertures therein adapted to receive the plastic composition of which the body of the bead is formed and portions between said apertures of lesser length than said apertures.

6. A bead reinforcement for vehicle tires consisting of a flexible sheet metal strip circled to hoop form and having an out turned flange at one edge, the body and flange having spaced apertures therein the metal from certain of said apertures being forced outwardly from the plane of the strip.

7. A bead reinforcement for vehicle tires consisting of a flexible sheet metal strip circled to hoop form and having an out turned flange at one edge, the body and flange having spaced integral portions partially severed and displaced to produce apertures.

8. As an article of manufacture, a bead for pneumatic tires comprising, a circular strip of resilient metal having circumferentially spaced punched out portions alternating upon opposite sides thereof.

In testimony whereof, I hereunto affix my signature.

HARVEY F. MARANVILLE.